UNITED STATES PATENT OFFICE.

JOHN T. CUPPER, OF LOCK HAVEN, PENNSYLVANIA.

CRYSTAL ALUMINIUM BRONZE.

SPECIFICATION forming part of Letters Patent No. 610,645, dated September 13, 1898.

Application filed January 20, 1898. Serial No. 667,322. (No specimens.)

*To all whom it may concern:*

Be it known that I, JOHN T. CUPPER, a citizen of the United States, residing at Lock Haven, in the county of Clinton and State of Pennsylvania, have invented certain new and useful Improvements in Crystal Aluminium Bronze; and I do hereby declare the following to be a full, clear, and exact description of the invention, such as will enable others skilled in the art to which it appertains to make and use the same.

This invention relates to a composition of crystal aluminium bronze in the form of a fine lustrous sparkling powder adapted (in connection with gum sizing) for protecting and giving a beautiful ornamental finish to metallic, wooden, and other surfaces.

The object of my invention is to provide a powdered composition adapted for giving a protecting coating which will not become oxidized or tarnished and will produce a brilliant ornamental effect. My powder is used as a protective and ornamental coating for letter-boxes, steam-radiators, safes, and many other articles with the most satisfactory results.

My composition consists of powdered aluminium and some form of powder or finely-comminuted glass or crystal, and preferably of what is known in the trade as "diamond-dust," and a small proportion of sulfate of zinc. The powdered glass or diamond-dust gives a brilliant sparkling effect to the coating when applied and makes it more durable than would be aluminium alone. The sulfate of zinc helps to make the composition luminous and gives a fine body to it. The above-named ingredients may be mixed in various proportions, and I do not wish to be confined to any particular proportions thereof or to a fixed percentage of any one ingredient. In practice I obtain satisfactory results with a composition in which the ingredients are combined in the following proportions, viz: powdered aluminium, sixty parts; powdered glass or diamond-dust, thirty-five parts, and sulfate of zinc, five parts. The powdered ingredients are simply thoroughly mixed together and put up for the trade, preferably in the dry state. In practice I preferably first apply a suitable gum sizing to the article to be protected and ornamented and then with a camel's-hair brush apply the powdered composition, as much as will apply to the surface of the article being coated. This composition not only gives a non-oxidizing and non-tarnishing coating, but produces a brilliant and ornamental effect.

If preferred, the crystal-aluminium-bronze powder may be mixed in any suitable vehicle, such as gum sizing, and applied with a brush to the article to be coated, as other liquid bronze is applied. By applying the sizing first to the article to be coated and then separately applying the powder I avoid the possibility of a mixture of sizing and powder becoming hardened and dried in a vessel and thus wasted.

Having described my invention, what I claim, and desire to secure by Letters Patent, is—

1. The herein-described crystal-aluminium-bronze composition consisting of powdered aluminium, powdered glass or "diamond-dust" and sulfate of zinc, mixed in suitable proportions, as set forth.

2. A crystal-aluminium-bronze composition containing powdered aluminium and powdered glass or "diamond-dust" in suitable proportions as set forth.

JOHN T. CUPPER.

Witnesses:
FRANK A. JOHNSON,
E. D. SELTZER.